(12) United States Patent
Morken et al.

(10) Patent No.: US 8,634,531 B2
(45) Date of Patent: *Jan. 21, 2014

(54) SYSTEMS AND METHODS FOR REESTABLISHING A CALL IN A TELECOMMUNICATIONS NETWORK

(71) Applicant: Bandwidth.com Inc., Raleigh, NC (US)

(72) Inventors: David Morken, Chapel Hill, NC (US); Timothy R. Missner, Cary, NC (US); L. Anders Brownworth, Cambridge, MA (US)

(73) Assignee: Bandwidth.com, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/928,621

(22) Filed: Jun. 27, 2013

(65) Prior Publication Data

US 2013/0294336 A1 Nov. 7, 2013

Related U.S. Application Data

(63) Continuation of application No. 12/974,648, filed on Dec. 21, 2010, now Pat. No. 8,526,591.

(51) Int. Cl.
*H04M 3/42* (2006.01)

(52) U.S. Cl.
USPC .................... 379/210.01; 370/259

(58) Field of Classification Search
USPC ..................... 379/210.01; 370/259
See application file for complete search history.

(56) References Cited

U.S. PATENT DOCUMENTS 6,449,588 B1 * 9/2002 Bowman-Amuah ............ 703/21

* cited by examiner

*Primary Examiner* — Creighton Smith
(74) *Attorney, Agent, or Firm* — Gregory Stephens

(57) ABSTRACT

A call server includes a network interface for connecting the call server to a packet-based network within a telecommunications network. The call server establishes a first connection with a calling party terminal and a second connection with a called party terminal via the packet-based network. The call server then joins the first connection with the second connection to establish communication between the calling party terminal and the called party terminal. The call server may park the second connection when the first connection is terminated or vice-versa and establish a new connection with the calling party terminal via the packet-based network if the first connection was terminated or vice versa. The call server may join the new connection with the first or second connection to reestablish communication between the calling party terminal and the called party terminal.

19 Claims, 5 Drawing Sheets

SYSTEMS AND METHODS FOR REESTABLISHING A CALL IN A TELECOMMUNICATIONS NETWORK

CROSS-REFERENCE TO RELATED APPLICATIONS

This application is a continuation of U.S. application Ser. No. 12/974,648, filed Dec. 21, 2010. The patent application identified above is incorporated here by reference in its entirety.

TECHNICAL FIELD

The present invention relates generally to a call reestablishment feature in a telecommunications network. In particular, the present invention relates to the implementation of a call reestablishment feature in an Internet Protocol ("IP") or other packet-based network or segment of a telecommunications network.

SUMMARY OF THE INVENTION

In one embodiment, a call server in a telecommunications network is disclosed. The call server includes a network interface for connecting the call server to a packet-based network in which the packet-based network comprises at least a segment of the telecommunications network. The call server also includes a memory for storing one or more program modules and a processor for executing the one or more program modules. The one or more program modules may comprise computer-executable instructions for causing the call server to: establish a first connection with a calling party terminal via the packet-based network, establish a second connection with a called party terminal via the packet-based network, join the first connection with the second connection to establish communication between the calling party terminal and the called party terminal, park the second connection when the first connection is terminated or park the first connection when the second connection is terminated, establish a new connection with the calling party terminal via the packet-based network if the first connection was terminated or establish a new connection with the called party terminal via the packet-based network if the second connection was terminated, and join the new connection with the first or second connection to reestablish communication between the calling party terminal and the called party terminal.

These and other aspects and features of the invention will be described further in the detailed description below in connection with the appended drawings and claims.

DETAILED DESCRIPTION OF EXEMPLARY EMBODIMENTS

Figure 1:
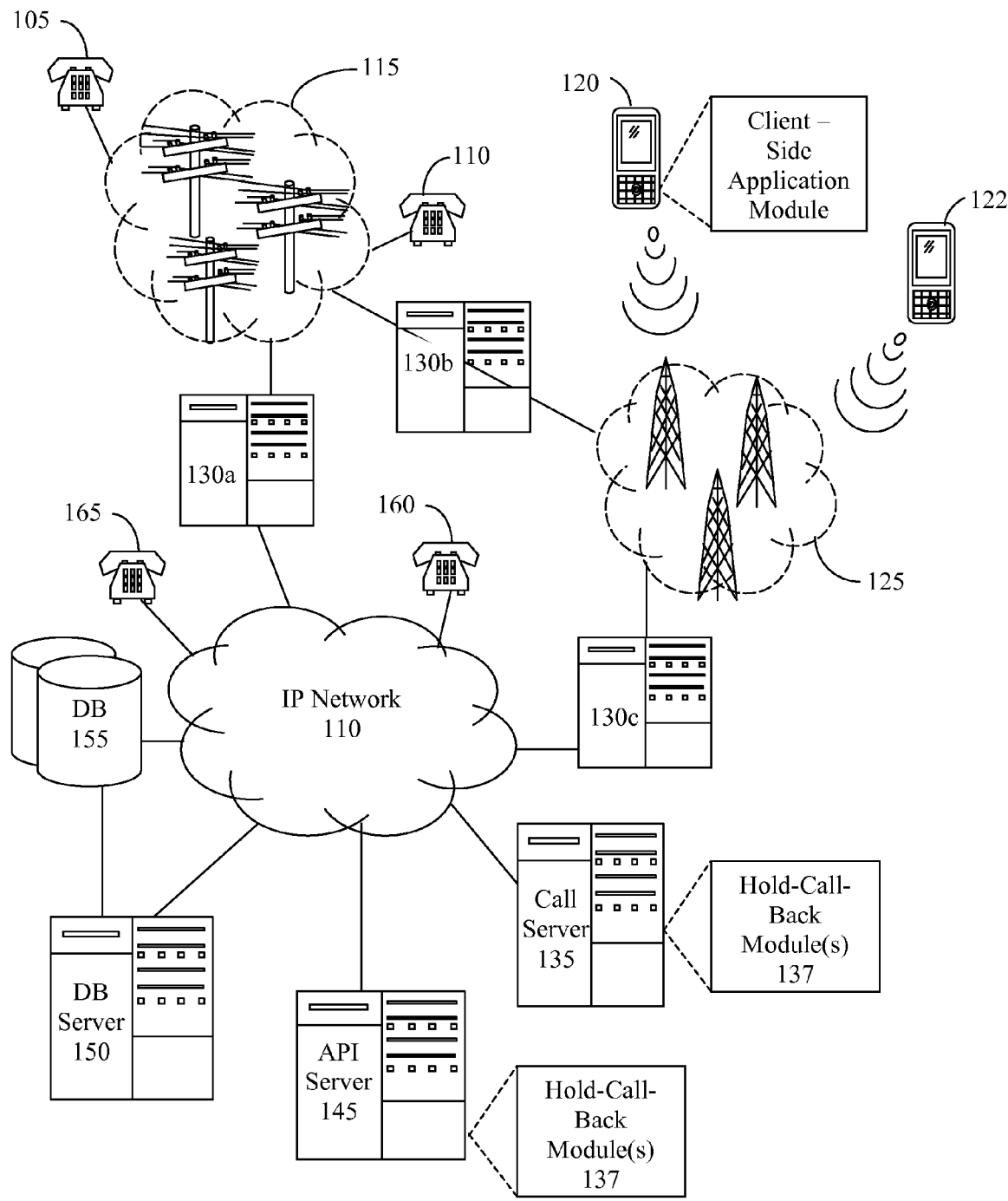
FIG. 1 is a block diagram illustrating an exemplary system for implementing a hold-call-back feature in a telecommunications network, in accordance with certain embodiments of the invention.

The present invention provides systems and methods for implementing a hold-call-back feature in a packet-based network or in a packet-based segment of a telecommunications network that includes packet-based and non-packet-based segments (i.e., a hybrid network). As used herein, the term "hold-call-back" is used to describe generally a calling feature that allows a caller to terminate a connection in response to the call being placed on hold and to receive a call-back when the party who initiated the call hold becomes available. Exemplary embodiments of the present invention will be described herein in the context of "Voice over IP" communications. Voice over IP, also referred to as "VoIP," is a general term of a family of methodologies, protocols, and transmission technologies for delivery of voice communications and multimedia sessions over IP networks. Those skilled in the art will appreciate, however, that the principles of the present invention may be applied to any packet-based communication protocols and technologies.

The hold-call-back feature is implemented through one or more software modules executed by one or more network servers (e.g., call server, API server, database server) connected to the IP network. Calls originating from or destined for the PSTN (or other non-IP segments of a telecommunication network) may be routed to and from the network servers by appropriate media gateways, session border controllers, etc. These devices are collectively, and generally, referred to herein as "gateway devices." In operation, a first call connection is established between a calling party terminal and a call server. The calling party terminal may dial an access number to establish this first connection, or may use a client-side application to request that the call server initiate the first connection. The call server may then prompt the calling party terminal to enter the phone number of the party to be called and, after that phone number is received by the call server, the call server initiates a second connection between itself and the called party terminal. The call server subsequently joins or bridges the first connection with the second connection to establish communication between the calling party terminal and the called party terminal.

If the call is placed on-hold by the called party, the calling party can invoke the hold-call-back feature by inputting a pre-determined star code or other activation command to the call server. After the call server receives the hold-call-back activation command, it splits the first connection from the second connection and then disconnects the first connection (i.e., the connection between the call server and the calling party terminal) but maintains the second connection (i.e., the connection between the call server and the called party terminal). The call server may play a message for or issue a prompt to the calling party terminal before terminating the first connection. With the first connection terminated, the calling party may hang up his/her terminal and is thus freed from the burden of holding on the line until the calling party is available. Then the call server repeatedly prompts the called party terminal for input of a command for reestablishing communication with the calling party. The call server monitors the second connection for input of the call reestablishment command by the called party terminal. If the call reestablishment command is detected, the call server initiates a new connection between itself and the calling party terminal. Once this new connection is established, the call server bridges it with the existing second connection (i.e., between the call server and the called party terminal) to reestablish communication between the calling party terminal and the called party terminal.

Reference will now be made in detail to various and alternative exemplary embodiments and to the accompanying figures, in which like numerals represent substantially identical elements. Each exemplary embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

FIG. 1 depicts an exemplary system 100 for implementing a hold-call-back feature in a telecommunications network, in accordance with certain embodiments of the invention. The exemplary system 100 may include one or more terminals 105 and 110 connected to the PSTN 115 and a gateway device 130a connecting the PSTN 115 to an IP network 110 (e.g., the Internet or a private IP network, etc.). The exemplary system 100 may also include one or more mobile terminals 120 and 122 in communication with a radio access network 125 and one or more gateway device 130b and 130c connecting the radio access network 125 to the PSTN 115 and the IP network 110, respectively. One or more network servers (e.g., call server 135, API server 145, and database server 150), one or more database 155 and one or more terminal 160 and 165 may also be connected to the IP network 110.

As used herein, a "terminal" refers to any wireline or wireless device for initiating and/or receiving calls, including traditional rotary terminals, pulse-activated DTMF terminals, cell phones, personal computers and the like. As will be appreciated, terminals can vary in connectivity, functionality and other characteristics and features. The present invention contemplates that one party (the "calling party") will use a first terminal (e.g. terminal 105) to call another party (the "called party"), who uses a second terminal (e.g., terminal 110, terminal 120 or terminal 160). For example, the called party may be an agent or operator in a call center or other location that receives a high volume of calls. However, the called party may in general be any user of any terminal. A call can comprise any voice or other type of media communication.

As is well known in the art, calls originating from, terminating in or passing through a non-IP network (e.g., the PSTN 115 or the radio access network 125) may pass through one or more gateway devices 130a-c, which, among other functions, convert digital media streams between disparate types of telecommunications networks. Gateway functionality is not unique to the present invention and is therefore not explained in further detail herein. Of course, the present invention also contemplates end-to-end VoIP calls between terminals (e.g., terminals 160 and 165) connected to the IP network 110 that would not require a gateway device 130a-c.

In accordance with the present invention, calls between terminals are managed by the call server 135. FIG. 1 depicts only a single call server 135 for simplicity, but multiple call servers 135 may be deployed in a scaled system. In the context of the present invention, a call server 135 can be a VoIP server or any other processor-driven device that is capable of executing instructions for establishing and/or managing call connections between terminals and for implementing the inventive hold-call-back feature as hereafter described. The call server 135 will thus include components such as a network interface for connecting to the IP network 110 and communicating with the resources thereof, a memory device for storing computer-executable instructions (e.g., software code) and data, and a processor for executing computer-executable instructions. Other components and the basic operation of processor-driven devices are well known in the art and are therefore not discussed herein.

In certain embodiments, the call server 135 may execute the Linux operating system and the FreeSWITCH communications platform. In such an environment, one or more "hold-call-back" modules 137, which include computer-executable instructions for performing the methods of the hold-call-back feature described herein, may be implemented as an application, or a component of an application, built on the FreeSWITCH platform. Examples of such applications include JSON and OpenSSL. In other embodiments, the call server 135 may execute any other suitable operating system and call management software and the hold-call-back module (s) 137 may be implemented as a component thereof or as a stand-alone application. The call server 135 may also execute speech recognition software, such as PocketSpynx or any other suitable program, for detecting speech commands transmitted by the various terminals. The call server 115 may also execute software module(s) for generating call records or the like.

Call records and other data (e.g., details regarding call connections, on-hold statistics, call durations and various actions taken by the calling party and called party) may be stored in the local memory of the call server 135, which may include a RAM, hard disk, removable disks, tape arrays, or any other computer readable medium. Alternatively, or additionally, the call server 135 may communicate with a database server 150 for storing call records and/or other data in one or more database 155. The database(s) 155 may be connected to the database server 150 and/or the IP network 110. The database server 155 can be implemented using PostGreSQL running on the Linux operating system, for example.

In some embodiments, functionality for implementing the inventive hold-call-back feature may be distributed among multiple servers, such as the call server 135, the API server 145 and the database server 150. For example, the API server 145 (or other web server) may interact with client-side application modules 170 executed by certain terminals 120 and 122, such as smart phones, personal computers, laptop or tablet computers or other computing devices, to initiate a new call. As a result of this interaction, the API server 145 may collect data from a calling terminal 120, such as the calling terminal's phone number and the phone number of a called terminal 160, and may send data and messages to the calling terminal 120. The API server 145 may then communicate with the database server 150 to establish and store a call record for the new call and send data to the call server 135 so that the call server 135 can establish a connection with the calling party terminal 120. For simplicity's sake, FIG. 1 depicts one call server 135, one API server 145 and one database server 150, but multiple of each of these devices can be used to implement a more scalable system. Additional details regarding these distributed embodiments are provided below with reference to FIGS. 4-6.

Figure 2:
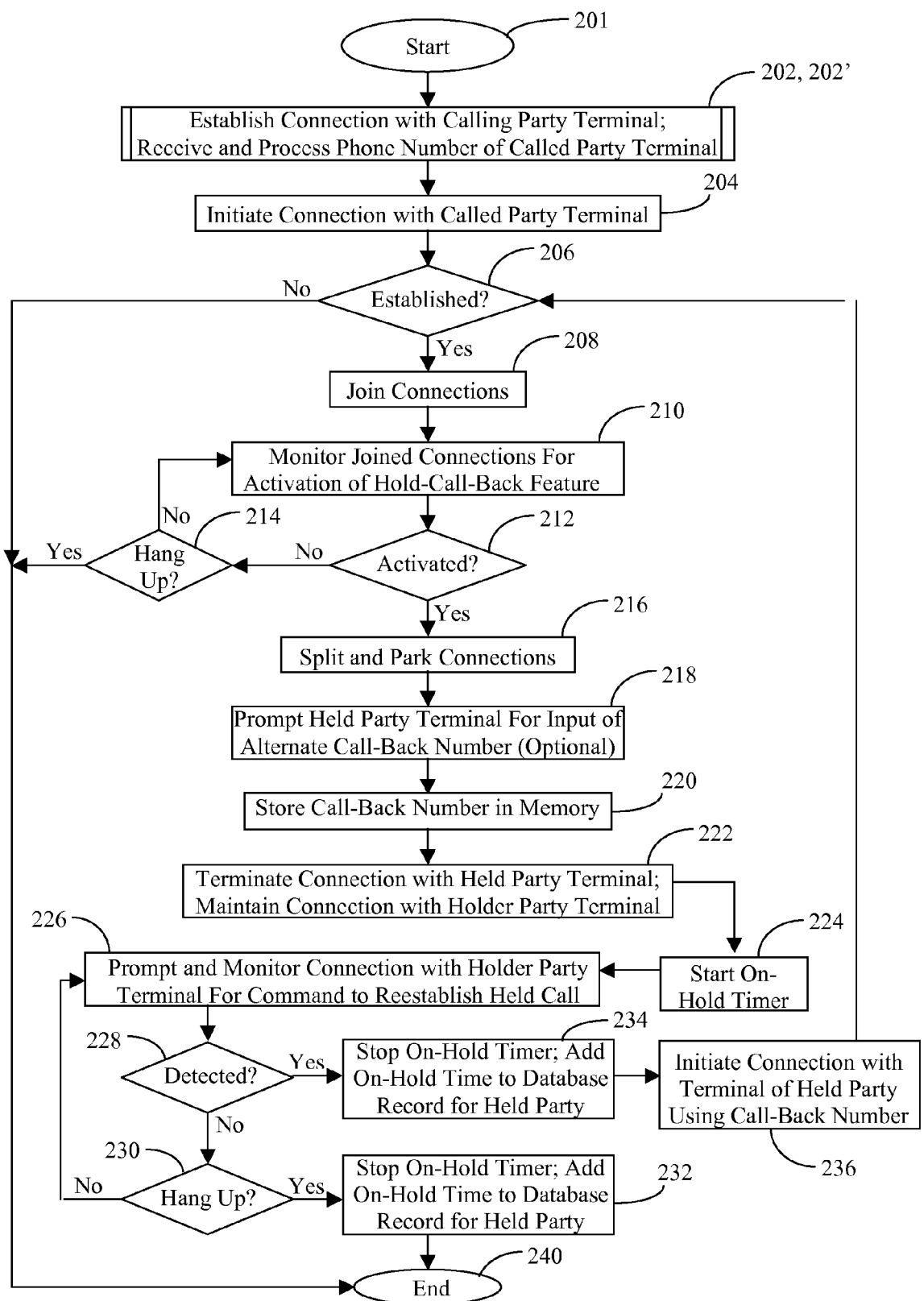
FIG. 2 is a flow chart illustrating an exemplary method for implementing a hold-call-back feature according to certain embodiments of the invention.

FIG. 2 is a flow chart illustrating an exemplary method 200 for implementing a hold-call-back feature according to certain embodiments of the invention. By way of example, the hold-call-back module(s) 137 executed by a call server 135 may comprise computer-executable instructions for performing the exemplary method 200 or a method similar thereto. The method begins at start step 201 and proceeds to step 202, 202' (see FIGS. 3 and 4), where a connection is established with a calling party terminal and a phone number for a called terminal is received from the calling party terminal and processed. As will be explained with reference to FIGS. 3 and 4, the connection with the calling party terminal may be initiated by the calling party terminal or by the call server. Once the phone number for the called party terminal is processed, e.g., to determine that the call is authorized, a connection to the called party terminal is initiated by sending a connection request to that phone number at step 204. If it is determined at step 206 that a connection cannot be established with the called party terminal, the method ends at step 240. However, if a connection is established with the called party terminal, the connection with the calling party terminal and the connection with the called party terminal (which are two separate call connections) are joined at step 208, to establish communication between the calling party terminal and the called party terminal.

The joined call connections are monitored at step 210 for activation of the hold-call-back feature. As described, activation of the hold-call-back feature may occur when one party, in response to determining that the other party has put the call on-hold, inputs an activation command, such as a predetermined star code, voice command, etc. In some embodiments, different commands may be used to activate different variations of the hold-call-back feature. For instance, a first command (e.g., *7) may be used to indicate that one party simply wishes to receive a call-back when the other party takes the call off hold; a second command (e.g., *6) may be used to indicate that one party wishes to receive a call back at a specified time, which can entered by that party in response to prompts; and a third command (e.g., *5) may be used to allow one party to record a message that will be played to the other party when the other party takes the call off hold. These and other variations for the hold-call-back feature will occur to those of skill in the art. In still other embodiments, the call server may be able to detect that one party has put the other on-hold and may prompt the held party terminal for a hold-call-back activation command.

If it is determined at step 212 that the hold-call-back feature has not been activated, a determination is made at step 214 as to whether either party has "hung-up", i.e., terminated the call. If either party has hung up, the method ends at step 240. If not, processing returns to step 210 to continue monitoring for activation of the hold-call-back feature. When it is determined at step 212 that the hold-call-back feature has been activated, the joined call connections are split and parked at step 216 so that neither party can hang up. Then at step 218, the held party terminal (i.e., the terminal that activated the hold-call-back feature) is prompted for optional input of an alternate call-back number. The call-back number (i.e., either the phone number of the held party terminal or a specified alternate call-back number) is stored in memory at step 220. The connection with the held party terminal is then terminated, while the connection with the holder party terminal (i.e., the terminal that placed the call on-hold) is maintained at step 222. In some embodiment, the connection with the held party terminal may not be parked to allow for input of an alternate call-back number.

At step 224, an on-hold timer is started. This timer tracks the amount of time the call remains on-hold. More specifically, this time tracks the amount of time the connection with the holder party terminal remains on hold. At step 226 the connection with the holder party terminal is prompted and monitored for a command to reestablish the held call. The prompt can be a voice recording or other communication capable of being received and acted upon by the holder party terminal. The prompt can be played continually at predetermined or variable intervals until an appropriate response is received or the holder party hangs up. The command call reestablishment command can be a star code, voice command or other suitable command. Thus, for example, the holder party may be prompted to "press 1 or say 'connect me' to reconnect your call" and the connection can be monitored for input of either of those commands. Alternatively, or in addition, customized prompts can be transmitted to the holder party terminal. For example, as described, the held party may have been given an option to record a voice message for the holder party (e.g., regarding the purpose of the call, information requested, etc.), which may be packaged with instructions on how to reconnect the call and transmitted to the holder party terminal. In such embodiments, the amount of time spent on-hold by the held party can be further reduced by providing the holder party with an opportunity to become more prepared for the call before entering the call reestablishment command, e.g., by obtaining the information requested in the voice recording.

At step 228, a determination is made as to whether the call reestablishment command is detected. If not, it is determined at step 230 whether the holder party terminal has hung up. If the holder party hangs-up the call, the on-hold timer is stopped and the on-hold time is added to a database record associated with the held party terminal (or held party) at step 232 and the method ends at step 240. If the holder party does not hang-up the call, the method returns from step 230 to step 226 to continue monitoring and/prompting the holder party terminal for the command to reestablish the call. When it is determined at step 228 that the call reestablishment command is detected, the on-hold timer is stopped and the on-hold time is added to a database record associated with the held party terminal (or held party) at step 234. Then, at step 236, a new connection is initiated with the terminal of the held party by sending a connection request to the call-back number that had been stored in memory. Accordingly, the terminal of the held party may be the same terminal that had previously been involved in the call, or may be a different terminal associated with an alternate call-back number specified by the held party. From step 236, the method returns to step 206 for a determination of whether the new connection with the held party is successfully established. If so, this new connection and the connection with the holder party are joined at step 210, so that the parties can again communicate with each other. From that point, the method continues in the same manner as described above.

Figure 3:
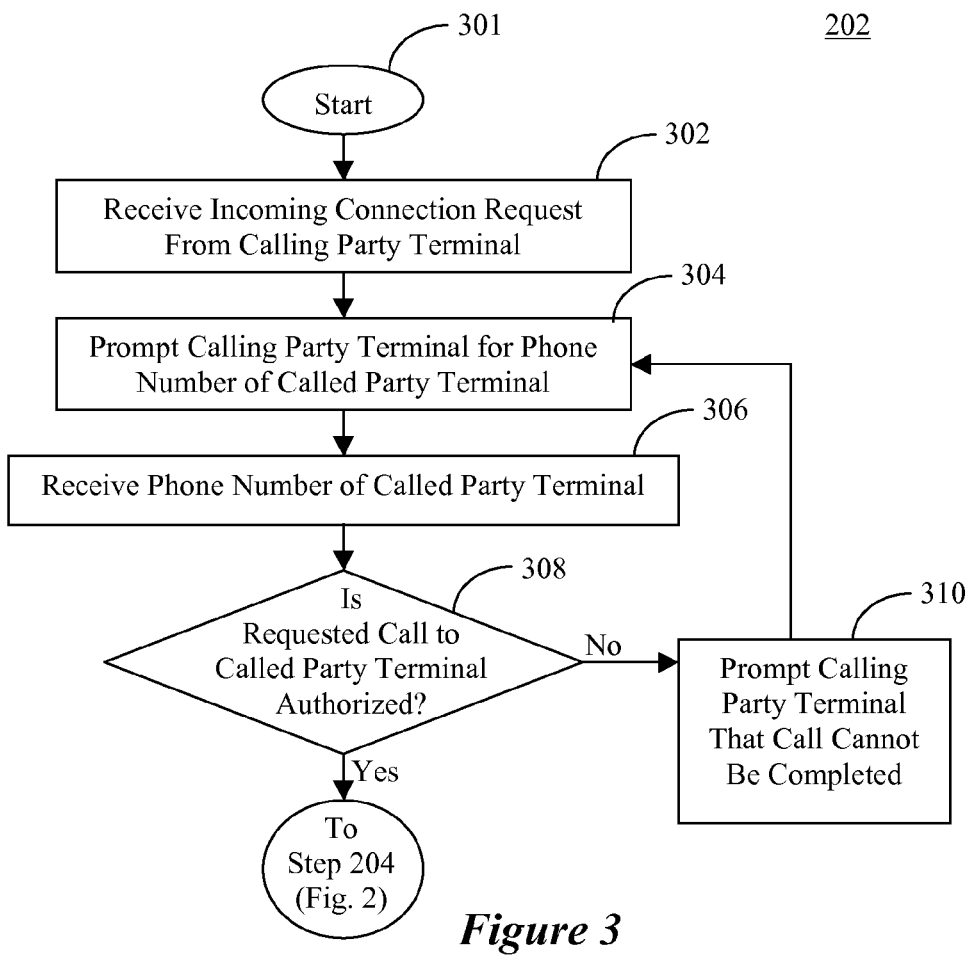
FIG. 3 is a flow chart illustrating an exemplary method for establishing a connection with a calling party terminal and receiving and processing a phone number for a called party terminal, in accordance with certain embodiments of the invention.

FIG. 3 is a flow chart illustrating in an exemplary method 202 (see FIG. 2) for establishing a connection with a calling party terminal and receiving and processing a phone number for a called party terminal. In certain embodiments, the described hold-call-back module(s) 137 executed by a call server 135 may comprise computer-executable instructions for performing the exemplary method 202 or a method similar thereto. The exemplary method begins at start step 301 and proceeds to step 302, where an incoming connection request is received from a calling party terminal. In such embodiments, the calling party terminal initiates a connection with a call server 135 by sending a connection request to a designated phone number associated with the call server 135. The call server 135 accepts the incoming connection request and thereby establishes a connection with the calling party terminal. Next at step 304 the calling party terminal is prompted for a phone number of a called party terminal. The prompt can be a voice recording or other communication capable of being received and acted upon by the calling party terminal. The phone number for the called party terminal is then received at step 306. As will be appreciated, the call server 135 may be configured to automatically determine and store the phone number for the calling party terminal when the connection with the calling party terminal is established, etc.

At step 308 a determination is made as to whether the call requested by the calling party terminal to the called party terminal is authorized to proceed. This determination may involve one or more sanity checks. For example, customer account details (e.g., stored in a database record) associated with the calling party terminal's phone number may be accessed to confirm that the account is current and no delinquencies exist. In addition, a rating database can be searched for rate records associated with the phone numbers of the calling party terminal and the called party terminal. If it is determined that either phone number is not associated with a rate record, or if the rate records indicate a cost for the requested call above a preset threshold (e.g., which may be associated with the calling party's account) then the call will not be authorized to proceed. Those skilled in the art will appreciate that various other sanity checks and other tests can be performed to determine if the requested call is authorized to proceed.

If the requested call is not authorized to proceed, the method proceeds to step 310 where the calling party terminal is prompted or otherwise notified that the call cannot be completed. From step 310, processing returns to step 304, where the calling party terminal is again prompted for a phone number of a called party terminal and the method continues from that point as previously described. When it is determined at step 308 that the requested call is authorized to proceed, the processing moves to step 204 (FIG. 2) for initiation of the connection with the called party terminal.

Figure 4:
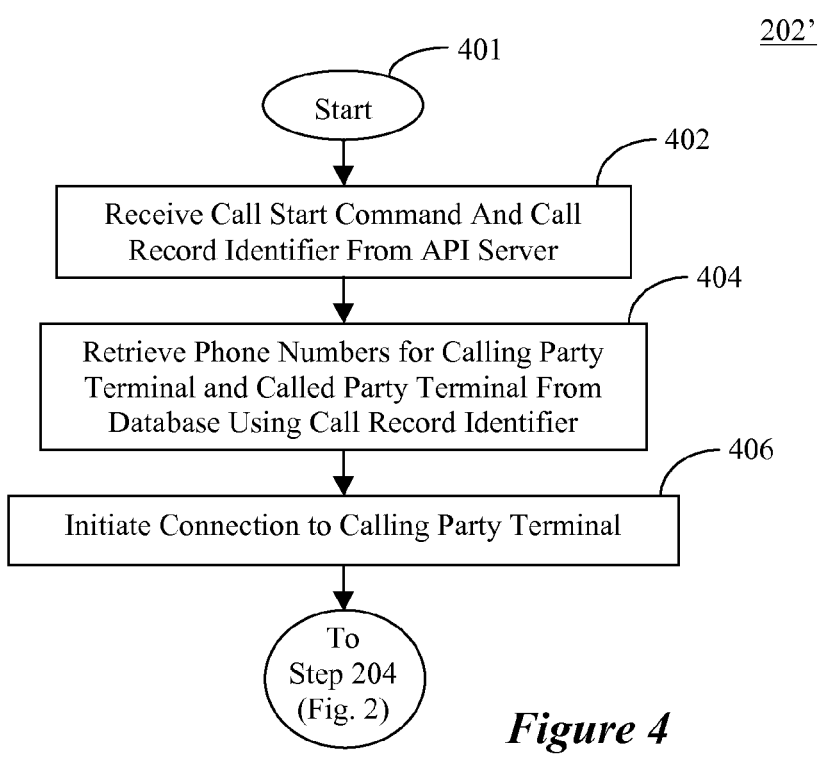
FIG. 4 is a flow chart illustrating an exemplary alternative method for establishing a connection with a calling party terminal and receiving and processing a phone number for a called party terminal, in accordance with certain embodiments of the invention.

FIG. 4 is a flow chart illustrating in an exemplary alternative method 202' (see FIG. 2) for establishing a connection with a calling party terminal and receiving and processing a phone number for a called party terminal. In such embodiment, the call server 135 interacts with an API server 145, which in turn interacts with the client-side application modules(s) executed by the calling party terminal. Thus, certain of the hold-call-back module(s) 137 may comprise computer-executable instructions for performing the exemplary method 202' or a method similar thereto. The exemplary method begins at start step 401 and proceeds to step 402, where a call start command and a call record identifier are received from the API server 145. Then at step 404, the phone numbers for the calling party terminal and the called party terminal are retrieved from a database record associated with the call record identifier. The applicable database record may be retrieved by interacting with the database server 150, in some embodiments. As will be explained with reference to FIG. 5, the call from the calling party terminal to the called party terminal may have already been authorized to proceed by the API server 145, thus making such an authorization step unnecessary (or at least optional) as part of method 202'. The phone number for the calling party terminal is used to initiate a call connection to the calling party terminal at step 406 and then processing moves to step 204 (FIG. 2) for initiation of the connection with the called party terminal.

Figure 5:
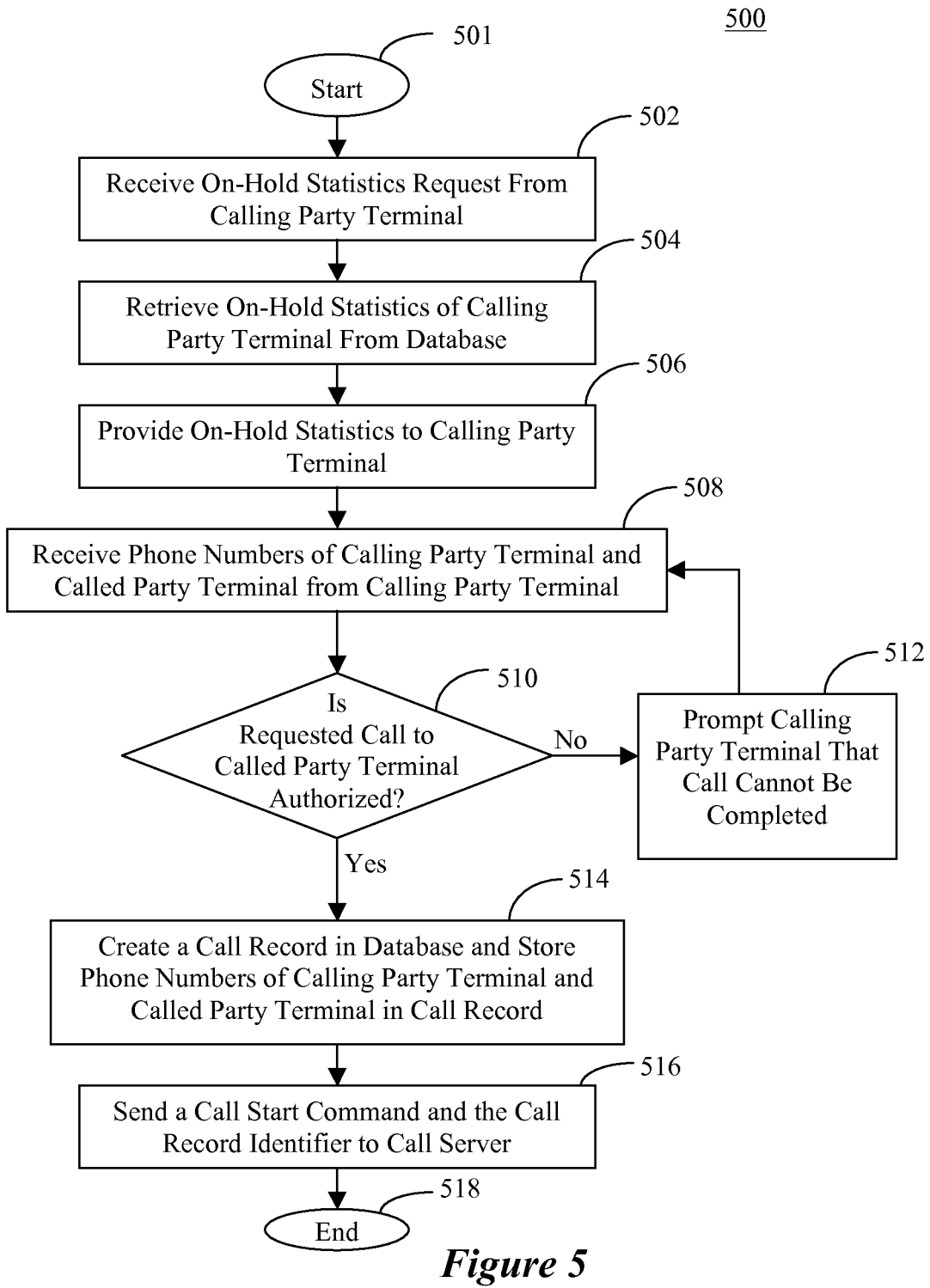
FIG. 5 is a flow chart illustrating an exemplary server-side method for initiating a call for which a hold-call-back feature is enabled, according to certain embodiments of the invention.

FIG. 5 is a flow chart illustrating an exemplary method 500 for initiating a call for which a hold-call-back feature is enabled, according to certain embodiments of the invention. In certain embodiments, this exemplary method 500 may be executed by an API server 145 or other web server. In other embodiments the exemplary method 500 may be executed by a call server 135 or another device. Thus, for example, certain of the previously mentioned hold-call-back module(s) 137 may comprise computer-executable instructions for performing the exemplary method 500 or a method similar thereto. The exemplary method 500 begins at start step 501 and proceeds to step 502, where a request for on-hold statistics is received from a calling party terminal. As described previously, the call server 135 can use timers to calculate on-hold times for calls in which the hold-call-back feature is activated. Thus, the on-hold statistics track the amount of time that the hold-call-back feature has "saved" a calling party over time by not requiring that party to remain on-hold during calls. In some embodiments, the request can be sent as a JSON statistics request that comprises a unique identifier associated with the calling party terminal.

At step 504, the on-hold statistics for the calling party terminal are retrieved from one or more database record associated with the calling party terminal. The database record(s) may indicate a total on-hold time for the calling party terminal, or may indicate individual on-hold times for multiple calls, which times can be summed to calculate a total on-hold time. At step 506, the on-hold statistics are provided to the calling party terminal for display to the calling party. By way of example, the calling party terminal may display a message indicating that the hold-call-back feature "has saved X minutes of your life." Those skilled in the art will appreciate that the provision of on-hold statistics is an optional feature of the invention and is not required in some embodiments to enable a hold-call-back feature. Therefore, steps 502-506 are to be considered optional steps within exemplary method 500.

At step 508, the phone numbers for the calling party terminal and the called party terminal are received from the calling party terminal (or possibly from another terminal). In some embodiments, this information is sent by the calling party terminal in an HTTPS API call with JSON, which includes the phone numbers and a unique identifier associated with the calling party terminal. Other messages and/or protocols may be used in other embodiments. Next at step 510 a determination is made as to whether the call requested by the calling party terminal is authorized to proceed. As described with reference to FIG. 3 (step 308), this determination may involve one or more sanity checks. For example, customer account details associated with the calling party terminal's phone number may be accessed to confirm that the account is current and no delinquencies exist. In addition, a rating database can be searched for rate records associated with the phone numbers of the calling party terminal and the called party terminal. If it is determined that either phone number is not associated with a rate record, or if the rate records indicate a cost for the requested call above a preset threshold then the call will not be authorized to proceed. Various other sanity checks and other tests can be performed to determine if the requested call is authorized to proceed.

If the requested call is not authorized to proceed, the method proceeds to step 512 where the calling party terminal is prompted or otherwise notified that the call cannot be completed. From step 512, processing returns to step 508 to again await receipt of phone numbers for the calling party terminal and called party terminal. For example, the calling party terminal may prompt the calling party to input a new called party phone number. Processing continues from step 508 as previously described, except that in some cases the method may be automatically terminated if new phone numbers are not received in a defined amount of time. If it is determined at step 510 that the requested call is authorized to proceed, a call record is created in the database and the phone numbers of the calling party terminal and the called party terminal are stored therein at step 514. Then, at step 516, a call start command and the call record identifier, which identifies the call record in the database, are sent to a call server. As mentioned, some exemplary systems according to the present invention may include more than one call server 135 for scalability purposes (e.g., load balancing, etc.) Accordingly, an API server 145 (or other device) executing the exemplary method 500 or a similar method for initiating a call connection may select a call server to handle the requested call. This selection may be based on availability, a random draw (e.g., a randomly weighted order of available call servers) or any of various other algorithms or processes. Following step 516, the exemplary method ends at step 518.

Figure 6:
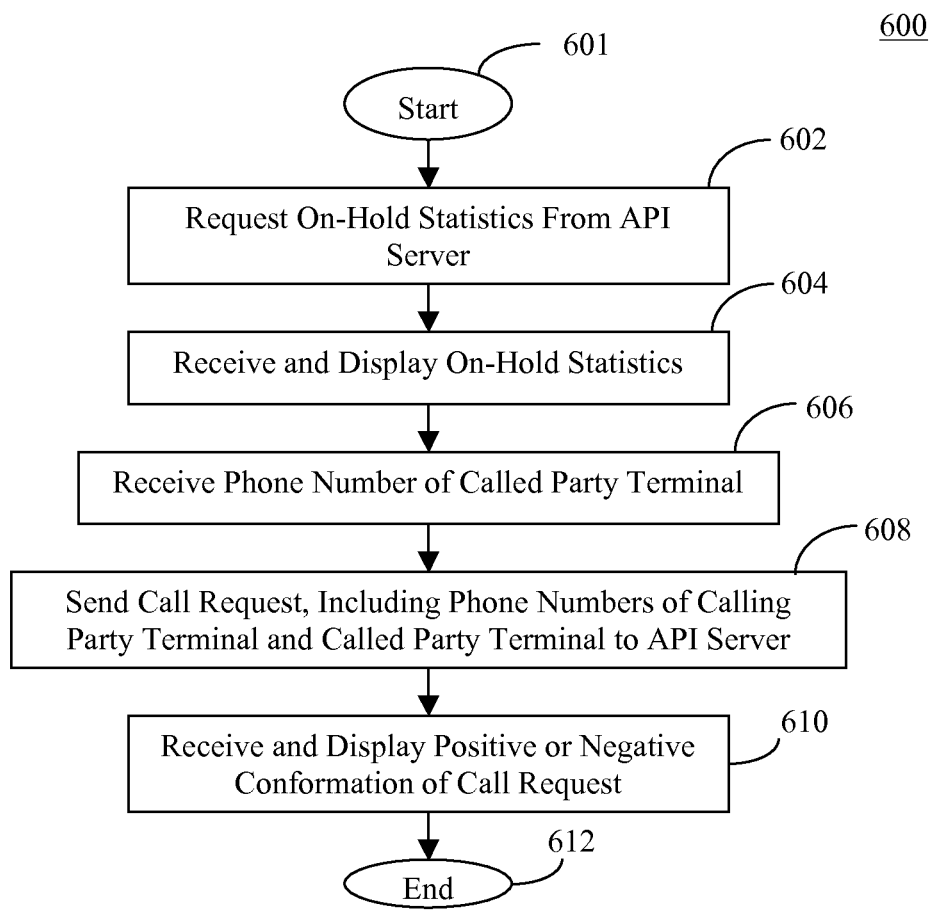
FIG. 6 is a flow chart illustrating an exemplary client-side method for initiating a call for which a hold-call-back feature is enabled, according to certain embodiments of the invention.

FIG. 6 is a flow chart illustrating an exemplary client-side method 600 for initiating a call for which a hold-call-back feature is enabled, according to certain embodiments of the invention. As described, certain types of terminals, such as smart phones, laptops, personal computers, etc., may execute client-side application modules 170 for interacting with an API server 145 or other server device to initiate a call. Thus, in some embodiments, the client-side application module may comprise computer-executable instructions for performing the exemplary method 600 or a method similar thereto. The exemplary method begins at starting step 601 and advances to step 602 where a request for on-hold statistics is made to an API server (or other appropriately configured device). As described, this request can be sent as a JSON statistics request in some embodiments. Other messages and/or protocols may be used in other embodiments. At step 604, the requested on-hold statistics are received and displayed. At step 606, the phone number of the called party is received. By way of example, the calling party terminal may prompt the calling party for input of a phone number, or may otherwise display a field in which a phone number can be input. Voice recognition and other input means are also contemplated.

In some embodiments, the calling party terminal may be configured to automatically reformat phone numbers to a standard ten-digit format, or may not accept any phone numbers that are not input in a standard ten-digit format. Once the phone number of the called party terminal is received, a call request is generated and sent to an API server (or other appropriately configured device) at step 608. The call request will include at least the phone numbers of the calling party terminal and the called party terminal. As mentioned, the call request may be in the form of an HTTPS API call with JSON. Other messages and protocols may alternatively be used. A positive or negative confirmation of the call request is received and displayed at step 610. As an example, a positive confirmation may indicate that the call request is being processed and a negative confirmation may indicate that the call cannot be completed as requested. Following step 610, the exemplary method ends at step 612.

Many other modifications, features and embodiments of the present invention will become evident to those of skill in the art. For example, the hold-call-back feature described herein may be implemented using various other device configurations and network architectures. Accordingly, it should be understood that the foregoing relates only to certain embodiments of the invention, which are presented by way of example rather than limitation. Numerous changes may be made to the embodiments described herein without departing from the spirit and scope of the invention as defined by the following claims.

The invention claimed is:

1. A call server in a hybrid telecommunications network comprising:
   a network interface for connecting the call server to a packet-based network comprising at least a segment of the hybrid telecommunications network wherein a non-packet based network comprises another segment of the hybrid telecommunications network;
   a memory for storing one or more program modules; and
   a processor for executing the one or more program modules, wherein the one or more program modules comprise computer-executable instructions for causing the call server to:
      receive a call start command and a call record identifier from an application programming interface (API) via the packet-based network;
      access a database record to retrieve a call record associated with the call record identifier, wherein the call record includes a phone number of a calling party terminal and a phone number of a called party terminal;
      establish a first connection with the calling party terminal via the packet-based network by sending a first connection request to the phone number of the calling party terminal,
      establish a second connection with the called party terminal via the packet-based network by sending a second connection request to the phone number of the called party terminal,
      join the first connection with the second connection to establish communication between the calling party terminal and the called party terminal,
      park the second connection when the first connection is terminated or park the first connection when the second connection is terminated,
      establish a new connection with the calling party terminal via the packet-based network if the first connection was terminated or establish a new connection with the called party terminal via the packet-based network if the second connection was terminated, and
      join the new connection with the first or second connection to reestablish communication between the calling party terminal and the called party terminal.

2. The call server of claim 1, wherein the one or more program modules further comprise computer-executable instructions for causing the call server to:
   establish the new connection by sending a third connection request to the phone number of the calling party terminal.

3. The call server of claim 1, wherein accessing the database record is accomplished by communicating with a database server via the packet-based network.

4. The call server of claim 1, wherein another segment of the telecommunications network includes a wireless cellular network.

5. The call server of claim 4, wherein at least one of the calling party terminal and called party terminal is a wireless handset.

6. The call server of claim 1, wherein at least one of the calling party terminal and called party terminal includes both Voice over IP (VoIP) and cellular capabilities.

7. A method of reestablishing a call in a hybrid telecommunications network, the method comprising:

receiving a call start command and a call record identifier from an application programming interface (API) via a packet-based network;

accessing a database to retrieve a call record associated with the call record identifier, wherein the call record includes a phone number of a calling party terminal and a phone number of a called party terminal;

establishing a first connection with the calling party terminal via a packet-based network by sending a first connection request to the phone number of the calling party terminal, wherein the packet-based network comprises at least a segment of the hybrid telecommunications network and a non-packet based network comprises another segment of the hybrid telecommunications network;

establishing a second connection with the called party terminal via the packet-based network by sending a second connection request to the phone number of the called party terminal;

joining the first connection with the second connection to establish communication between the calling party terminal and the called party terminal;

parking the second connection when the first connection is terminated or parking the first connection when the second connection is terminated, establishing a new connection with the calling party terminal via the packet-based network if the first connection was terminated or establishing a new connection with the called party terminal via the packet-based network if the second connection was terminated, and joining the new connection with the first or second connection to reestablish communication between the calling party terminal and the called party terminal.

8. The method of claim 7, further comprising:

creating an updated call record comprising the phone number of the calling party terminal and the phone number of the called party terminal; and storing the updated call record in a database in association with the call record identifier.

9. The method of claim 7, further comprising:

prior to establishing the second connection, determining that the calling party terminal is authorized to make a call to the called party terminal.

10. The method of claim 9, wherein determining that the calling party terminal is authorized to make the call to the called party terminal comprises:

accessing a database record associated with the calling party terminal to confirm that an account is current.

11. The method of claim 7, further comprising:

establishing the new connection by sending a third connection request to the phone number of the calling party terminal.

12. The method of claim 7, wherein another segment of the telecommunications network includes a wireless cellular network.

13. The method of claim 12, wherein at least one of the calling party terminal and called party terminal is a wireless handset.

14. The method of claim 7, wherein at least one of the calling party terminal and called party terminal includes both Voice over IP (VoIP) and cellular capabilities.

15. A system for reestablishing a call in a hybrid telecommunications network, comprising:

a call server in communication with an application programming interface (API), a calling party terminal and a called party terminal via a packet-based network comprising a segment of the hybrid telecommunications network wherein a non packet based network comprises another segment of the hybrid telecommunications network, the call server programmed to:

receive from the calling party terminal a phone number of the calling party terminal and a phone number of a called party terminal;

create a call record comprising the phone number of the calling party terminal and the phone number of the called party terminal;

store the call record in a database in association with a call record identifier;

receive a call start command and the call record identifier from the API via the packet-based network and access the database to retrieve the call record associated with the call record identifier to obtain the phone number of the calling party terminal and the phone number of the called party terminal;

establish a first connection with the calling party terminal via the packet-based network using the phone number of the calling party terminal and establish a second connection with the called party terminal via the packet-based network using the phone number of the called party terminal;

join the first connection with the second connection to establish communication between the calling party terminal and the called party terminal;

park the second connection when the first connection is terminated or park the first connection when the second connection is terminated;

establish a new connection with the calling party terminal via the packet-based network if the first connection was terminated or establish a new connection with the called party terminal via the packet-based network if the second connection was terminated; and join the new connection with the first or second connection to reestablish communication between the calling party terminal and the called party terminal.

16. The system of claim 15, wherein the call server is further programmed to:

establish the new connection by sending a third connection request to the phone number of the calling party terminal.

17. The system of claim 15, wherein another segment of the telecommunications network includes a wireless cellular network.

18. The system of claim 17, wherein at least one of the calling party terminal and called party terminal is a wireless handset.

19. The system of claim 15, wherein at least one of the calling party terminal and called party terminal includes both Voice over IP (VoIP) and cellular capabilities.

\* \* \* \* \*